3,474,120
NICKEL BROMIDE-ACETYLENE REACTION PRODUCT

Robert J. Tedeschi, Whitehouse Station, and George L. Moore, South Plainfield, N.J., assignors to Air Reduction Company, Incorporated, New York, N.Y., a corporation of New York
No Drawing. Filed Dec. 19, 1967, Ser. No. 691,725
Int. Cl. C07f 15/04
U.S. Cl. 260—439                         3 Claims

ABSTRACT OF THE DISCLOSURE

A complex of nickel bromide and acetylene is prepared by reacting nickel bromide wiith liquefied acetylene. The complex is useful as a catalyst for the polymerization and carbonylation of acetylene.

---

This invention relates to derivatives of acetylene and is more particularly concerned with complexes of acetylene and a metallic salt.

Complexes of acetylene with certain compounds have previously been reported. For example, a complex of acetylene and ammonia is described by Tedeschi and his co-workers in J. Org. Chem. 28, 1740 (1963) and J. Org. Chem. 30, 3045 (1965), the latter publication also referring to complexes of acetylene and certain alkali metal hydroxides. A diacetylene - N-methyl-pyrrolidinone complex has also been isolated by N. Shachat, J. Org. Chem. 27, 2928 (1962).

It is an object of this invention to provide novel acetylene complexes.

In accordance with the invention, it has been discovered that when acetylene in liquefied form is reacted with nickel bromide there are formed acetylene-nickel bromide complexes or aducts which contain one molecule of nickel bromide (NiBr) and two to three molecules of acetylene with an apparent formula of

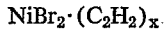

$$NiBr_2 \cdot (C_2H_2)_x$$

where $x=2-3$. This compound is useful as a catalyst for the polymerization of acetylene and the carbonylation of acetylene or ethylene, and when so used may be supported upon a carrier of the type used for other catalysts for such reactions, or it may be used in homogeneous solution.

In forming the complexes of this invention, the reaction between the liquefied acetylene and nickel bromide is most advantageously carried out at a temperature of about —30° to 50° C., preferably about 10° to 35° C. The acetylene can be used in previously liquefied form, or gaseous acetylene can be liquefied in the reaction vessel itself by introducing the gaseous acetylene under pressure into the vessel at a low temperature so that the acetylene is cooled below its critical temperature.

The liquid acetylene used in accordance with this invention can be readily prepared by introducing compressed gaseous acetylene into a cooled vessel from a gas cylinder or other source. Ordinary cylinders of acetylene are at a pressure of about 250 p.s.i.g. when full. The acetylene can be used directly from the cylinder but preferably the pressure of the acetylene is increased to about 400 p.s.i.g. before the liquefaction step by introducing the acetylene into a pressure vessel or accumulator and pumping mineral oil into the bottom of the vessel until the desired acetylene pressure is obtained. As previously mentioned, the liquefaction of the acetylene is most readily effected in the autoclave or other vessel in which the reaction of the invention is to be carried out. Thus, the compressed gaseous acetylene is introduced into the reaction vessel which is suitably cooled to a sufficiently low temperature to cause liquefaction of the acetylene. By using vapor pressure-temperature and density-temperature data such as found in V. J. Clancey, "Liquid and Solid Acetylene: A Review of Published Information" (England); Explosives Research and Development Establishment Survey Jan. 5, 1961, 1952, and in S. A. Miller, "Acetylene," Academic Press, pp. 506–516 (1965), the temperature needed for liquefaction of acetylene at a given acetylene pressure can be readily ascertained. In general, with an acetylene pressure of about 400 p.s.i.g., a temperature of —10 to —30° C. is sufficient to allow rapid liquefaction of the acetylene. Cooling of the reaction vessel, which is, of course, supplied with appropriate cooling coils or a cooling jacket, is readily achieved by means of any suitable cooling medium, and a particularly effective cooling medium is methanol which has been cooled by circulation through coils immersed in secondary butanol, or a mixture of ethylene, glycol and methanol, containing pieces of solid carbon dioxide (Dry Ice). Heating of the reaction vessel is easily effected by circulating the methanol through a body of warm water.

In a preferred procedure, the nickel bromide is first introduced into the reaction vessel, which is, of course, a pressure vessel, such as an autoclave adapted to withstand the pressures encountered. The autoclave is then sealed except for valved feed and exit lines. The liquefied acetylene is then added, most suitably, as mentioned, by directly liquefying it in the vessel wihch has been cooled to the appropriate temperature for liquefaction of the acetylene at the pressure under which the acetylene is introduced. Exit and feed valves are finally closed and the temperature raised to the desired reaction temperature. The time of reaction will vary, but ordinarily it will be complete within 6 hours. However, the above-mentioned reaction time is not limitative of the invention, and shorter or longer times may be employed as required. The time of reaction is related to the number of molecules of acetylene which enter into the complex. Thus, a shorter reaction time favors the formation of the complex containing two molecules of acetylene, whereas longer reaction times favor the introduction of a third molecule of acetylene.

The nickel bromide and the acetylene are used in proportions such that there are at least two moles of acetylene per mole of nickel bromide, with an excess of acetylene being preferred, and the molar ratio between the acetylene and the nickel bromide is advantageously at least 5:1, is preferably at least about 10:1. Higher ratios can be used, but there is generally no advantage in a ratio above 25:1.

The reaction zone is freed from air and dried before the reactants are introduced. This is suitably effected by sweeping the reaction zone with a dry inert gas, such as dry nitrogen. After the reaction is completed, excess acetylene is vented and the complex which has been formed is then removed.

As mentioned, the reaction is suitably carried out in any reaction vessel adapted to be operated under gauge pressure, such as an autoclave suitably jacketed for temperature control and provided with an agitator, and the components of the reaction mixture are introduced by the use of conventional supply means, such as cylinders or tanks. The amounts charged to the autoclave are advantageously determined by the use of conventional gauging or measuring devices.

The invention will now be further illustrated by reference to the following specific examples, but it will be understood that the invention is not limited to these illustrative embodiments.

EXAMPLE 1

The apparatus employed was a 125 ml. stainless steel, high-pressure autoclave, which was equipped with an inner coil and jacket for heating and cooling and a suitable stirrer. The autoclave was dried by warming to about 50° C. and sweeping with $N_2$ prior to adding the nickel bromide. Anhydrous commercial nickel bromide powder (10.8 g., 0.043 mole, 100% basis) was quickly introduced into the dry autoclave under a moderate current of dry nitrogen gas and the autoclave was then quickly sealed. Efficient cooling was effected by the use of a 2–3 gallon reservoir of ethylene glycol-methanol (1:1) in which a copper cooling coil was immersed. Copper lines from the coil exposed to the atmosphere and leading to the autoclave were insulated. The methanol cooling liquid in the system was circulated by means of a pump. By continual introduction of small pieces of solid carbon dioxide into the reservoir a temperature of −40° to −60° C. was readily reached.

After cooling to about −40° C., acetylene was condensed in the autoclave (44 cc. of liquid, 0.90 mole).

A moderate exothermic effect was observed on liquefaction which was readily controlled by the circulating heat exchange fluid. After all the acetylene had been liquefied into the reactor, the autoclave stirrer was turned on and the reaction temperature cautiously raised to the 25–30° C. range. No pronounced or significant exothermic effect was observed on raising the temperature. The reaction mixture was stirred at 24–32° C. for a total of three and one-half hours. The reaction pressure during the reaction period varied between 630 and 710 p.s.i.g.

The autoclave stirrer was turned off, the autoclave vent line connecting to the vented stack draft was disconnected, and the autoclave vent valve was then very carefully and slowly opened to avoid a sudden pressure surge and the gas slowly vented through the meter at a rate of approximately 1 to 2 liters per minute. The total volume of gas vented through the meter was 21.1 liters.

The autoclave was opened under a positive pressure of nitrogen and the product, a light yellow powder, was removed. It was found to be completely soluble in water and was obtained in 89% conversion based on the salt used.

Acetylene recovery and calculations showed the product to contain two moles of acetylene per mole of nickel bromide, viz. $NiBr_2 \cdot (C_2H_2)_2$.

EXAMPLE 2

The procedure described in Example 1 was repeated except that the reaction was continued for a total of four and one-half hours. The product recovered in 95% conversion was found from analytical values and calculations to contain 3 moles of acetylene per mole of nickel bromide, viz. $NiB_2 \cdot (C_2H_2)_3$. It also was a yellowish powder completely soluble in water.

It will be understood that various changes and modifications can be made without departing from the invention as above described, and without departing from the invention as defined in the appended claims. It is intended, therefore, that all matter contained in the foregoing description shall be interpreted as illustrative only and not at limitative of the invention.

We claim:

1. The process of producing a complex of nickel bromide and acetylene which comprises reacting nickel bromide with liquefied acetylene.

2. A complex of acetylene and nickel bromide.

3. A complex as defined in claim 2 having the formula $NaBr_2 \cdot (C_2H_2)_x$, wherein $x$ is 2 or 3.

References Cited

Nast et al.: Z. fur Anorg. u. Allgem. Chem. 295 (1958), pp. 227–31.

TOBIAS E. LEVOW, Primary Examiner

A. P. DEMERS, Assistant Examiner

U.S. Cl. X.R.

252—431; 260—94.1, 604, 605

PO-1050
(5/69)

UNITED STATES PATENT OFFICE
CERTIFICATE OF CORRECTION

Patent No. 3,474,120          Dated October 21, 1969

Inventor(s) Robert J. Tedeschi and George L. Moore

It is certified that error appears in the above-identified patent and that said Letters Patent are hereby corrected as shown below:

Col. 1, line 36, "aduct" should read -- adducts --.

Col. 2, line 27, "wihch" should read -- which --.

Col. 4, line 10, "$NiB_2$" should read -- $NiBr_2$ --;

line 19, "at" should read -- as --;

line 26, "$NaBr_2$" should read -- $NiBr_2$ --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents